US008003910B2

(12) United States Patent
Pippin

(10) Patent No.: US 8,003,910 B2
(45) Date of Patent: Aug. 23, 2011

(54) MAIL DELIVERY SYSTEM AND METHOD

(75) Inventor: James M. Pippin, Keller, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/589,637

(22) Filed: Oct. 26, 2009

(65) Prior Publication Data

US 2010/0110496 A1 May 6, 2010

Related U.S. Application Data

(62) Division of application No. 11/206,649, filed on Aug. 18, 2005, now abandoned.

(60) Provisional application No. 60/602,574, filed on Aug. 18, 2004.

(51) Int. Cl.
*G06K 9/00* (2006.01)

(52) U.S. Cl. ............. 209/584; 209/3; 209/3.3; 209/900; 235/494

(58) Field of Classification Search ............... 209/3, 3.3, 209/584; 235/494, 495
See application file for complete search history.

(56) References Cited

U.S. PATENT DOCUMENTS

| | | | | |
|---|---|---|---|---|
| 254,836 | A | 3/1882 | Nauerth | |
| 1,418,403 | A | 6/1922 | Smith | |
| 3,167,074 | A | 1/1965 | Toms | |
| 3,732,978 | A | 5/1973 | Reader | |
| 4,117,975 | A * | 10/1978 | Gunn | 235/494 |
| 4,201,339 | A * | 5/1980 | Gunn | 235/487 |
| 4,789,248 | A | 12/1988 | Penas | |
| 4,802,773 | A | 2/1989 | Gross | |
| 4,836,428 | A | 6/1989 | Evans et al. | |
| 5,000,325 | A | 3/1991 | D'Elia | |
| 5,190,252 | A | 3/1993 | Schrager | |
| 5,238,139 | A | 8/1993 | Bisceglia | |
| 5,329,102 | A * | 7/1994 | Sansone | 235/375 |
| 5,758,574 | A * | 6/1998 | Bernardo et al. | 101/2 |
| 5,845,826 | A | 12/1998 | Nguyen | |
| 6,005,945 | A * | 12/1999 | Whitehouse | 380/51 |
| 6,360,001 | B1 * | 3/2002 | Berger et al. | 382/101 |
| 6,427,021 | B1 | 7/2002 | Fischer et al. | |
| 6,865,560 | B1 * | 3/2005 | Sansone et al. | 705/404 |
| 6,947,574 | B1 * | 9/2005 | Graulich et al. | 382/101 |
| 2002/0031284 | A1 | 3/2002 | Pippin et al. | |
| 2002/0079255 | A1 * | 6/2002 | Anderson | 209/703 |
| 2003/0118191 | A1 * | 6/2003 | Wang et al. | 380/285 |
| 2003/0208298 | A1 | 11/2003 | Edmonds | |
| 2004/0168993 | A1 | 9/2004 | Pippin et al. | |
| 2005/0269249 | A1 | 12/2005 | Pippin et al. | |

* cited by examiner

*Primary Examiner* — Terrell Matthews
(74) *Attorney, Agent, or Firm* — Filip A. Kowalewski

(57) ABSTRACT

The invention provides a method for preparing mail for delivery by first sorting mail to carrier delivery order to create a series of batches of mail for delivery to respective recipients, then packaging the batches of mail in mail holders. Application of computer-implemented alert trigger criteria are used to determine whether a condition exists indicating an enhanced probability that one or more mail pieces in each batch is not correctly addressed such that it should not be delivered to that recipient. An alert mark is then printed on the mail holder for a batch containing one or more mail pieces having an enhanced probability of not being correctly addressed.

11 Claims, 2 Drawing Sheets

MAIL DELIVERY SYSTEM AND METHOD

This application is a divisional of U.S. Ser. No. 11/206,649, filed Aug. 18, 2005 now abandoned which claims priority of U.S. Provisional Application 60/602,574, filed Aug. 18, 2004.

FIELD OF THE INVENTION

This invention relates to postal sorting machines, methods and systems.

BACKGROUND OF THE INVENTION

Mail sorting processes for placing mail in carrier delivery order are well known in the art, and recently the use of delivery point packaging of mail to each recipient address has been proposed as a means making it easier for mail carriers to deliver the mail. The present invention relates to common subject matter with commonly-owned U.S. patent application Ser. No. 11/128,494, filed May 13, 2005, the entire contents of which are incorporated by reference herein. In that application, one system for manual delivery of mail to a series of recipients comprises a stack of folders each having a front flap, a back flap and a central fold, and one or more mail pieces disposed in each folder. All of the mail pieces in each folder are to be delivered to the same recipient, and the folders are stacked in a predetermined order for a carrier delivery route. One flap of each folder has the destination address for the recipient printed thereon, and each folder further comprises areas of releaseable contact adhesive on inner faces of the front and back flaps. See generally FIGS. 25-28 of the foregoing application. A band binding the stack together was also an option.

During and prior to mail sorting, information is generated that is associated with an enhanced likelihood that a mail piece is erroneously addressed. The present invention makes use of such information to provide improvements to the delivery point packaging systems described in the foregoing application.

SUMMARY OF THE INVENTION

The invention provides a holder for manual delivery of mail to a recipient having one or more alert marks thereon which signify that a predetermined action should be taken during mail delivery. The holder may be a bag, folder or any similar device suitable for holding mail and accepting printing. The alert marking distinguishes the holder from others lacking such a mark and prompts the mail carrier to inspect the holder's contents for a potential problem, such as mail not properly deliverable to that address.

A system for manual delivery of mail to a series of recipients according to the invention includes a stack of folders each comprising a front flap, a back flap and a central fold. One or more mail pieces are disposed in each folder, wherein all of the mail pieces in each folder are to be delivered to the same recipient, and the folders are stacked in a predetermined order for a carrier delivery route. One or more folders in the stack have one or more alert marks thereon which each signify that a predetermined action should be taken during mail delivery. Under normal circumstances a majority of the folders will remain unmarked, i.e., the alert marks should not be so widely used that excessive manual inspection is required.

The invention further provides a method for preparing mail for delivery that includes the steps of:

sorting mail to carrier delivery order to create a series of batches of mail for delivery to respective recipients;

packaging the batches of mail in mail holders;

determining by application of computer-implemented alert trigger criteria whether a condition exists indicating an enhanced probability that one or more mail pieces in each batch is not correctly addressed such that it should not be delivered to that recipient; and printing an alert mark on the mail holder for a batch containing one or more mail pieces having an enhanced probability of not being correctly addressed. These and other aspects of the invention are discussed in the detailed description that follows.

BRIEF DESCRIPTION OF THE DRAWINGS

In the accompanying drawing, like numerals denote like elements, and.

DETAILED DESCRIPTION

Figure 1:
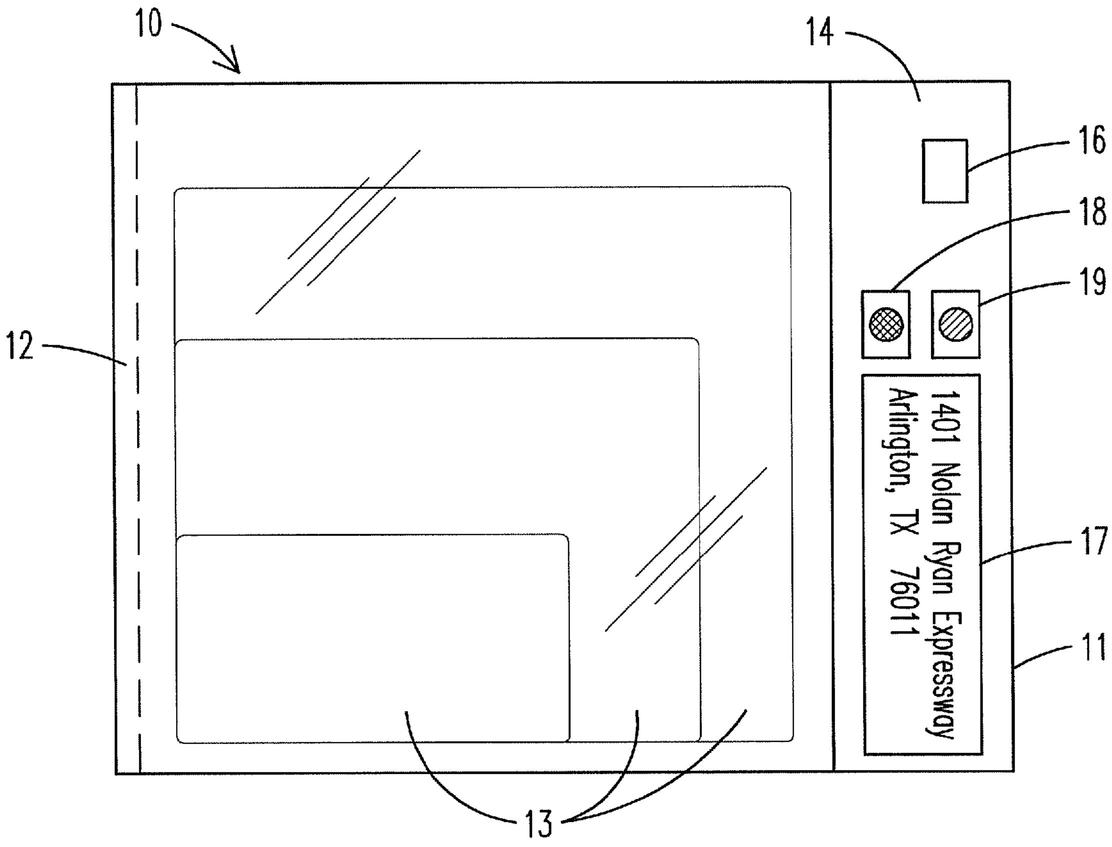
FIG. 1 is a side view of a mail piece holder according to the invention with mail therein.
Figure 4:
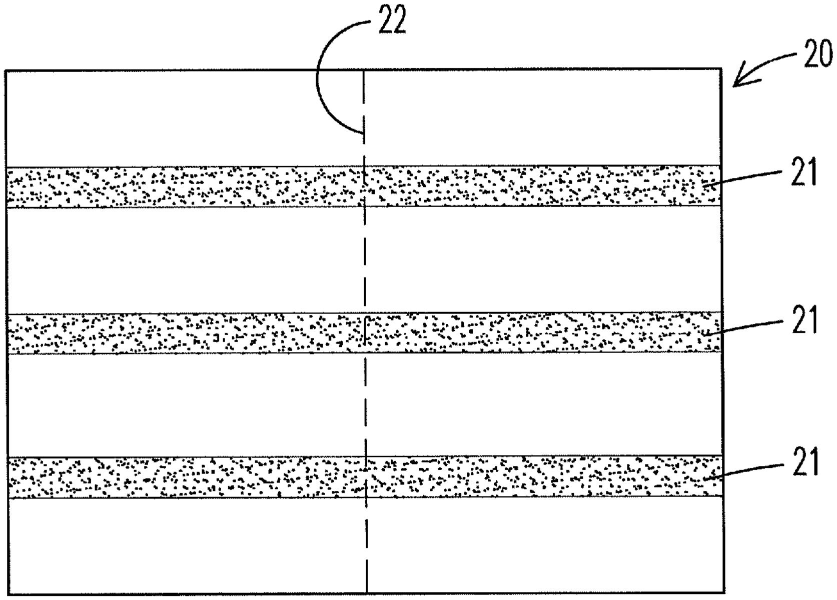
FIG. 4 is a rear view of a blank for making the mail piece holder of FIG. 2.
Figure 2:
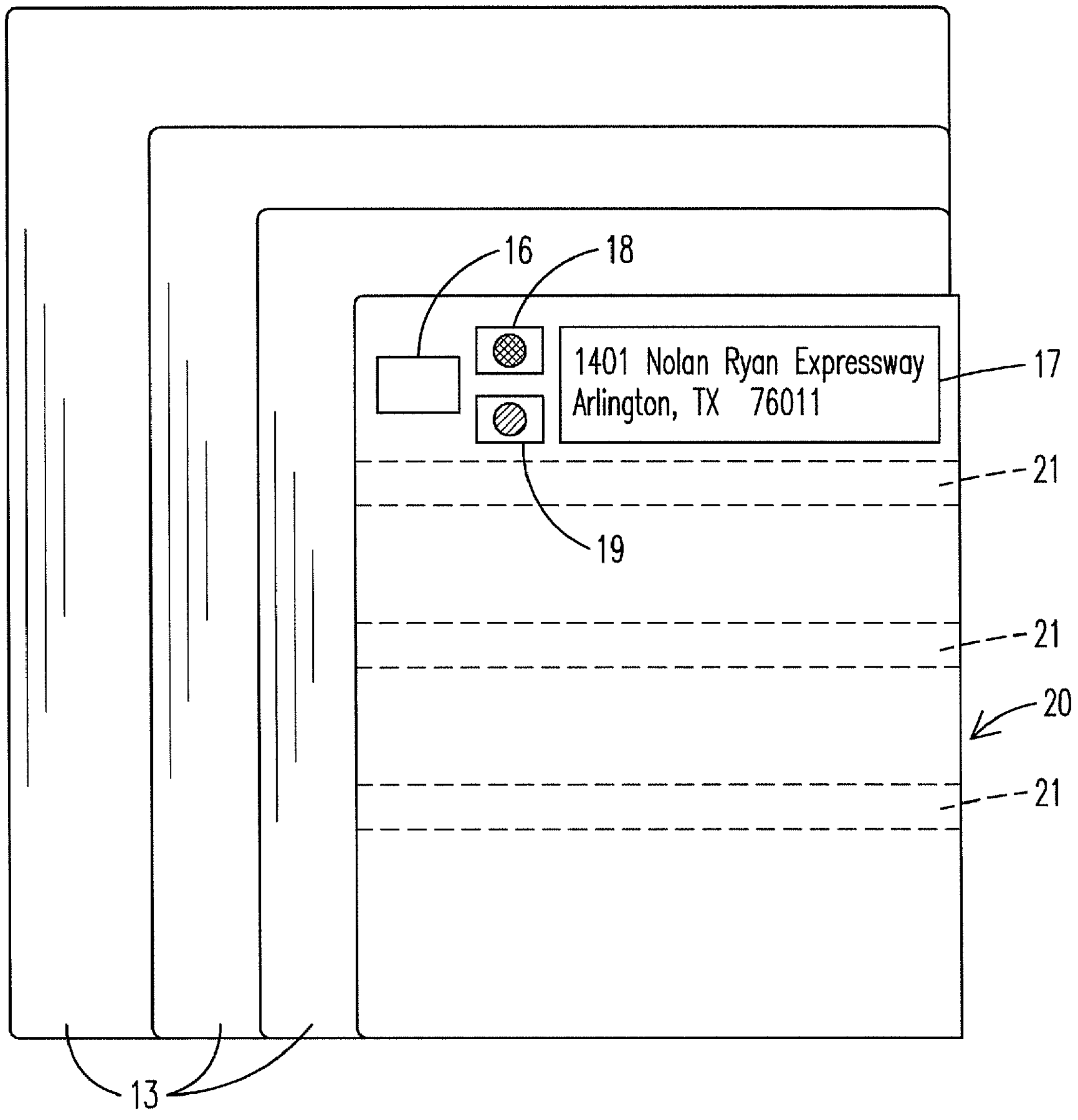
FIG. 2 is a side view of a further mail piece holder according to the invention with mail therein.
Figure 3:
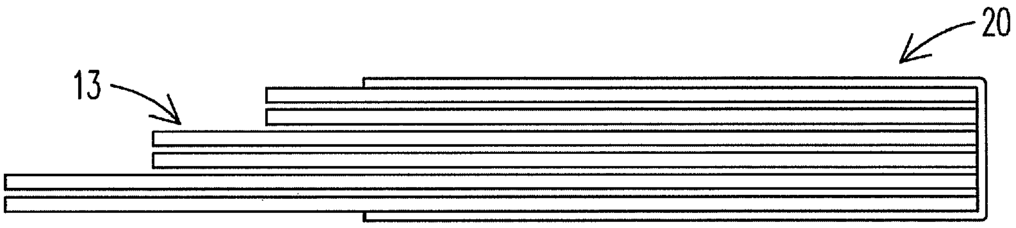
FIG. 3 is an end view of the mail piece holder shown in FIG. 2.

FIGS. 1-4 illustrate improvements on the bag and folder-style mail holders of the above-cited patent application, specifically adapted to be light enough in weight and low enough in cost to be delivered to each postal recipient with the mail, rather than re-used. FIG. 1 illustrates a bag embodiment 10 having an open end 11 on one side and a weld seam 12 on the other. Mail pieces 13 of varying sizes are enclosed in bag 10 with their left edges aligned. A margin 14 on one side of bag 10 is preprinted with a white or other colored background. Margin 14 is printed during the packaging process with a marking 16 indicating that there is more than one holder for that destination and giving the current holder's number (i.e., 1 of 3, 2 of 3, etc.). The recipient address 17 is printed along with a pair of carrier alert marks 18, 19 explained hereafter. FIGS. 2-4 depict a folder-style holder 20 with releaseable contact adhesive stripes 21 to help control the mail.

In each case the mail holder 10, 20 is provided with carrier alert marks 18, 19 to improve carrier efficiency by use of visual markings on the delivery point package. The alerts are aimed at prompting or alerting the carrier to take various specific actions. A "merge alert mark" 18 printed on the outside of the holder 10, 20 alerts the carrier that there is additional mail which needs to be merged or delivered together with the mail contained within the holder. This is determined by a computer at the time of sorting and the information is stored in a database and used to mark (print) the holder 10 during extraction packaging. A statistically-based QC (quality control) alert 19 alerts the carrier to inspect the mail within the package to determine if it matches the address printed on the package. The alert marks are preferably positioned near the recipient address 17.

The alert mark 19 is given based on confidence levels generated during the sorting process, i.e. parameters that give rise to a substantial probability that the package contains mail that is erroneously addressed in some fashion. This may be, for example, that one or more of the mail pieces has an address that was resolved by machine resolution of ambiguous OCR characters with a relatively high chance that the computerized resolution was incorrect.

An intelligent QC alert according to the invention preferably uses a database to selectively mark the delivery point package. The database uses correlation from lower threshold read confidence derived via statistics, the OCR classifier, mail involved in a doubles detect event, mail type, route type, address characteristics and video coding/back log to determine in a correlated fashion which and how many packages should be marked. Such a mark targets the package for carrier inspection thus increases effectiveness and lowers mail handling and inspection cost. Intelligent markings or targeted QC marks allows more frequent inspections, thus lowering misdelivery rate and improving service.

The following table illustrates one example of a QC alert scheme:

| | | A Trigger | B 1-5 Weighting | C A × B = C |
|---|---|---|---|---|
| | SOFT TRIGGER ALERTS - Scoring Logic | | | |
| 1 | Inside doubles detection band | 0 or 1 | 1-5 | 0-5 |
| 2 | Low confidence threshold of OCR classifier trigger | 0 or 1 | 1-5 | 0-5 |
| 3 | High error frequency for respective address | 0 or 1 | 1-5 | 0-5 |
| 4 | Video coding verification request | 0 or 1 | 1-5 | 0-5 |
| 5 | Mail size measurement (height, length, thickness) | 0 or 1 | 1-5 | 0-5 |
| 6 | Patron forwarding request | 0 or 1 | 1-5 | 0-5 |
| | Total: | | | 0 to 30 |
| | HARD ALERT TRIGGERS | | | |
| 7 | Random inspection request | 0 or 1 | — | — |
| 8 | Carrier or end user requested alert | 0 or 1 | — | — |
| | TOTAL: | 0-2 | | |

A computer-implemented system of alert triggers is used to determine whether a given holder will be marked for inspection. Alert triggers are a series of mail properties measured during sorting or input into the system from an external source that indicate an enhanced probability that mail in that holder is not correctly addressed.

Doubles detection systems are well known in the art. A mail piece involved in a doubles detection event has an enhanced probability of being misread or of bringing with it an additional mail piece not intended for that destination. The "doubles detection band" is a spectrum of possibilities from 0 to 100%, where 0% corresponds to a false positive (double detected, but no chance of it actually being a double), and 100% corresponds to a true positive (double detected with certainty.) This data is available from existing doubles detection systems.

A threshold value is determined by trial and error or past experience, which value is greater than 0 but less than 100%. When the reported value for a mail piece going into the holder is above the threshold, the trigger multiplier of column A is set to 1; otherwise it is zero. A weighting factor (Col. B) is also selected in order to weight the double detection band data relative to the other criteria to be considered (rows 2-6 above). In this example, the weighting factor is from 1 to 5, 1 by default. Column C of the table shows the product of A*B, in this case from 0 to 5. The computer calculates similar scores for the other criteria for each mail piece, resulting in a total score from 0 to 30. This may then be multiplied by a multiplier representing mail batch quality from 1 to 4, resulting in a total score from 0 to 120.

A threshold QC alert value such as from 5 to 25 is then chosen based on the desired sensitivity of the process. If the total score exceeds the threshold, then that mail piece causes a QC alert mark to be placed on the holder. Optionally, it may also be desirable at an earlier stage of processing to print the QC alert mark on the suspect mail piece(s) as well, directing the carrier to that mail piece once he or she examines the marked holder.

A low confidence level from the OCR classifier (row 2 above), a parameter known in the art, is associated with an enhanced chance of an incorrect address and can be scored in the same manner as the doubles detection band. The historical rate of misdelivery to a specific address (row 3) may also rise to a level where it triggers a carrier alert. A video coding verification request (row 4) is a flag set by a human video coding operator indicating he or she is not completely sure that the address is correct as entered by the operator, and requests verification by the carrier. Mail size is also a likely parameter. Mail types other than letter mail have a higher overall address error rate, and this may be sufficient reason for carrier review. However, this factor might get a relatively low weight (B=1) as compared to low OCR confidence (B=3) or a high historical error frequency at that address (B=5). All of these parameters can be evaluated and scored for each mail piece.

In the foregoing example, if any one mail piece going into the holder 10, 20 triggers an alert, the holder is marked for inspection. Since a mail holder used in the invention will often contain several or many mail pieces as opposed to just one, scoring may instead be cumulative for all mail pieces in the batch. In such a case, several slightly suspicious mail pieces in the same holder batch might trigger an alert even when no one of them exceeds the individual mail piece alert threshold.

The system may also incorporate hard alert triggers that cause a QC alert mark to be printed without further scoring or evaluation. As part of an overall quality assurance program, some holders 10, 20 can be marked at random for inspection. An end user or the carrier may request a QC review based on their own experience, e.g., the postal patron so requests after having received an unusual amount of his neighbor's mail. The hard alert will typically be one time only but could be recurring over a period of time or until the problem is rectified and the alert canceled.

Once the system has applied the foregoing criteria and decided that a holder 10, 20 should be QC alert marked, the mark 19 may be printed optionally along with an error code telling the carrier what caused the alert. A text description of the cause of the alert can be printed in lieu of a code if desired. Alternatively, it may be sufficient to omit a dot or other alert symbol entirely and just print the error code or alert message in colored ink.

The threshold for QC alert marking may depend in part on the nature of the carrier's route and the amount of time the carrier will have to perform such inspection. For a walking route where the carrier can inspect the mail while walking, a higher threshold can be used, resulting in more holders marked for carrier inspection. For a driving route where the carrier has little time to inspect, the threshold is raised so that fewer holders are marked, namely only the ones with the highest probability of a problem.

In FIG. 1, the holder is a plastic bag 10 that is as thin as possible to reduce cost, preferably made of LDPE. The marks and address of the recipient may be printed using laser printing, thermal transfer, inks etc. The bag should have sufficient capacity to hold mail up to dimensions 2"×12"×16", weight up to 6 pounds.

In FIGS. 2-4, the holder 20 may be an ordinary 8.5"×11" sheet of paper folded in half along a central fold 22 as shown, such as twenty pound weight (75 g/$m^2$) white bond paper with at least one, preferably three, parallel, spaced stripes 21 of light tack, releaseable contact adhesive on one side. These stripes preferably run the entire length of the holder so that they engage the endmost mail pieces in the stack and also the edges of the mail pieces in the holder as shown in FIG. 3. By this means, the package tends to stay together even if no band or other closure is provided.

While this invention has been described with reference to illustrative embodiments, this description is not intended to be construed in a limiting sense. Various modifications and combinations of the illustrative embodiments will be apparent to persons skilled in the art upon reference to the description. Such variations and additions are specifically contemplated to be with the scope of the invention. It is intended that the appended claims encompass any such modifications or embodiments.

The invention claimed is:

1. A method for preparing mail for delivery, comprising:

sorting mail to carrier delivery order to create a series of batches of mail for delivery to respective recipients;

packaging the batches of mail in mail holders;

determining by application of computer-implemented alert trigger criteria whether a condition exists indicating an enhanced probability that one or more mail pieces in each batch is not correctly addressed such that it should not be delivered to that recipient; and printing an alert mark on the mail holder for a batch containing one or more mail pieces having an enhanced probability of not being correctly addressed.

2. The method of claim 1, wherein the holder is a folder.

3. The method of claim 1, wherein the holder is a bag.

4. The method of claim 1, wherein the alert mark is a symbol or colored printed message.

5. The method of claim 1, further comprising manually inspecting mail inside holders having an alert mark thereon; and delivering such mail if manual inspection indicate it is correctly addressed.

6. The method of claim 5, further comprising a step of printing a statistically-based quality control alert mark on the holder that alerts the carrier to inspect the mail within the holder to determine if it is correctly addressed.

7. The method of claim 1, wherein mail pieces having an enhanced probability of not being correctly addressed include mail pieces involved in a doubles detection event during sorting.

8. A method for preparing mail for delivery, comprising:

sorting mail to carrier delivery order to create a series of batches of mail for delivery to respective recipients;

packaging the batches of mail in mail holders;

determining by application of computer-implemented alert trigger criteria whether a batch should be accompanied by additional mail that should be merged with and delivered with the mail in the holder; and printing a merge alert mark on the mail holder for a batch accompanied by additional mail that should be merged with and delivered with the mail in the holder.

9. A method for preparing mail for delivery, comprising:

sorting mail to carrier delivery order to create a series of batches of mail for delivery to respective recipients;

packaging the batches of mail in mail holders;

determining by application of statistically-based computer-implemented alert trigger criteria whether a batch should be marked for manual inspection by a postal carrier to determine if it is correctly addressed; and printing a quality control alert mark on the mail holder for a batch indicated by the alert criteria.

10. The method of claim 9, wherein the alert criteria include random selection of batches for inspection.

11. The method of claim 9, wherein the alert mark is printed because the mail pieces in the batch include one or more mail pieces involved in a doubles detection event during sorting.

* * * * *